Patented Dec. 13, 1949

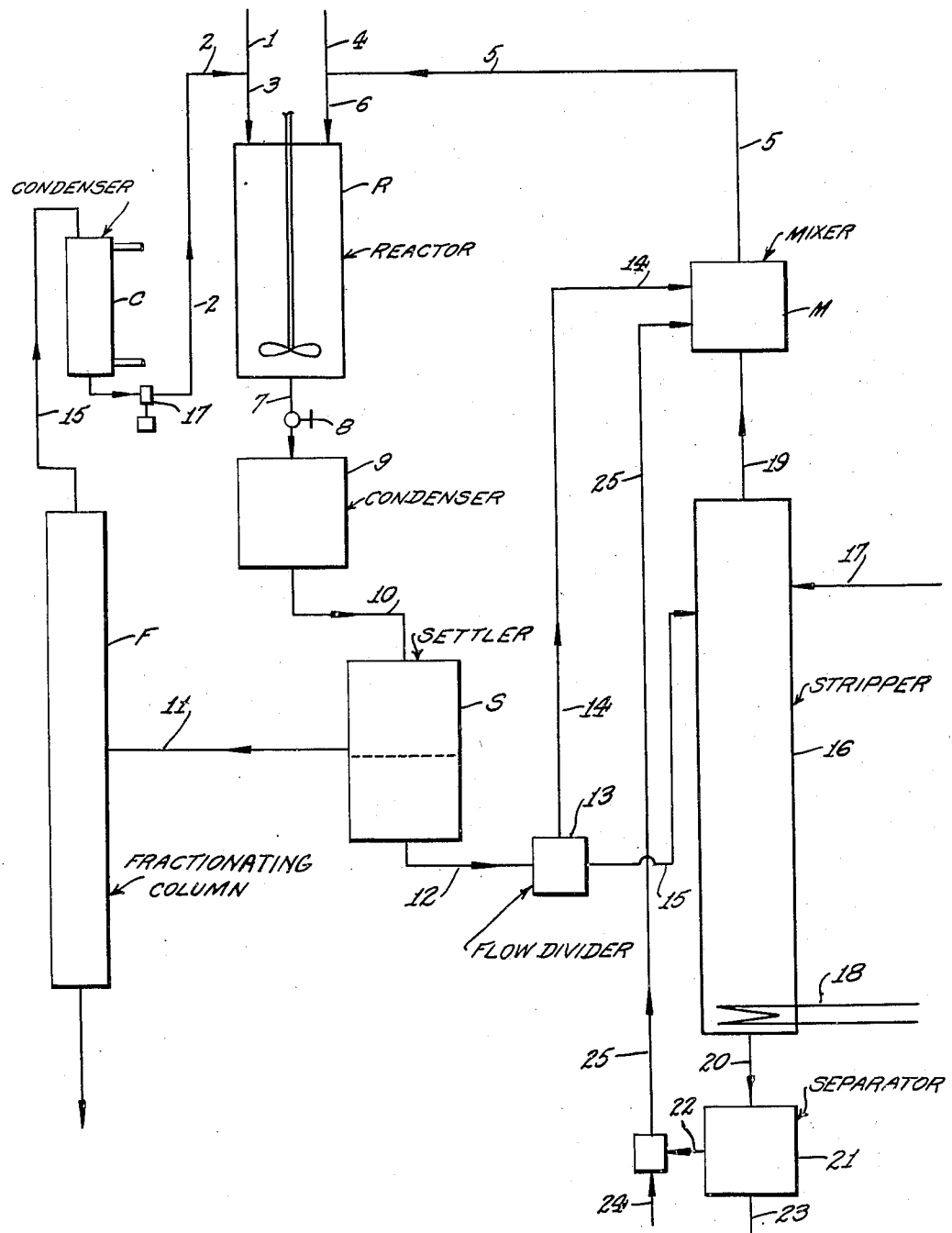

2,490,813

UNITED STATES PATENT OFFICE 2,490,813

CONTINUOUS PROCESS FOR MAKING ARYL AMINES

Everett C. Hughes, Cleveland Heights, and Franklin Veatch, Cleveland, Ohio, assignors to The Standard Oil Company, Cleveland, Ohio, a corporation of Ohio Application November 29, 1944, Serial No. 565,712

4 Claims. (Cl. 260—581)

This invention relates to a process of making aryl amines.

The formation of aniline by the reaction of chlorobenzene with ammonia in the presence of copper chloride has been accomplished heretofore. The reaction is carried out with an excess of ammonia, and the hydrogen chloride by-product from the reaction converts a part of the excess ammonia to ammonium chloride. In a continuous process the ammonium chloride would build up in the system to an undesirable level. In order to eliminate the ammonium chloride and to recover the ammonia therefrom for reuse, it has been proposed to add a base stronger than ammonia, which releases the ammonia and forms a corresponding chloride salt. At the same time the catalyst is precipitated by the base as hydrated copper oxide. Such a process is disadvantageous because it is necessary to filter all of the copper precipitate and this material is difficult to filter. In addition the copper precipitate must be used as the catalyst upon recycling in a continuous process, or it must be placed in solution. In the former case the yields are greatly reduced; in the latter case, additional amounts of acid are required for the solution.

It is an object of the invention to provide a process of forming aryl amines in which only a portion of the catalyst need be precipitated, thus greatly reducing the amount of precipitate to be filtered.

A further object of the invention is the provision of a process in which the precipitated catalyst is redissolved without the use of an external solubilizing agent, and prior to its introduction into the reaction zone.

An additional object of the invention is to provide a process in which the aryl halide, the ammonia or amine, and the neutralizing base are utilized in chemical equivalent amounts as the only materials used in forming the aryl amine, and in which the halide salt and water are formed in amounts chemically equivalent to the amine consumed as the only by-products of the reaction, and in which the catalyst may be continuously recycled and is in solution form as the halide thereof at the time it is introduced into the reaction zone.

The invention is applicable to the production of a wide variety of amino-substituted aromatics, such as aniline from a mono-halogenated benzene and ammonia, or an N-alkyl aniline from a halogenated benzene and an alkylamine.

For illustrative purposes only, the invention will be described as applied to the reaction of mono-chlorobenzene with mono-methylamine in the presence of a copper chloride as a catalyst to form N-methyl aniline as the wanted product and with the use of caustic soda as the neutralizing base to form sodium chloride and water as the by-products.

The process is preferably carried out as a continuous operation, since it is in such a process that the recovery and reuse of the catalyst and any unreacted ingredients is possible on a highly economic scale.

In carrying out the illustrative process the chlorobenzene is placed in a reactor together with an aqueous phase containing methylamine and copper chloride. The chlorobenzene is relatively insoluble in the aqueous solution and tends to exist as a distinct phase. However, the two phases can be intimately admixed by any appropriate agitating means. The reaction is continued under temperature and pressure conditions, as indicated hereinafter, and is permitted to proceed for the desired length of time to obtain a good yield. The initial chemical reaction may be viewed substantially as follows:

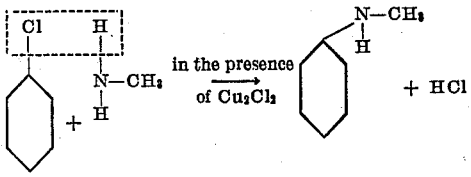

However, inasmuch as an excess of the methylamine preferably is employed, the hydrochloric acid produced will react with such an excess in accordance with the following reaction to form the amine hydrochloride:

At the conclusion of the reaction, the agitation may be discontinued and the reaction mixture will separate in two phases. Inasmuch as the reaction is generally carried out at an elevated temperature and pressure, in order that it may proceed to a good yield in a reasonable time, it is convenient to cool the mixture before the separation is accomplished.

One layer comprises the N-methyl aniline and any small amount of unreacted chlorobenzene. This layer may be withdrawn and subjected to fractional distillation. Any unreacted chlorobenzene can be separated readily from the N-methyl aniline because of their wide difference in boiling point. The recovered chlorobenzene can be recycled to the reaction zone.

The other layer comprises an aqueous phase containing the unreacted excess of methylamine, the methylamine hydrochloride, and the copper chloride catalyst in solution.

In general, the lower layer is the aqueous phase, but it is possible for the lower layer to be the non-aqueous phase in the case of low catalyst concentration and low conversion.

The aqueous phase containing the methylamine hydrochloride and the copper chloride is then divided into two streams. One stream is mixed with caustic soda in an amount to release all of the methylamine from the hydrochloride and to convert the copper chloride to the hydrated copper oxide. This reaction will be substantially as follows:

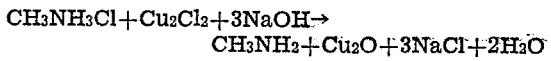

The recovered methylamine can be separated by distillation, the copper oxide can be separated by filtration or centrifuging, and the remaining salt solution is waste. The separated copper oxide can be placed in the form of a slurry and added to the other stream of the divided aqueous phase containing the amine hydrochloride so that the copper goes into solution as the chloride liberating the amine. The amounts of the two streams can be adjusted so as to solubilize all of the copper in this manner, and the solution can be recycled in admixture with a fresh amount of methylamine equivalent to that reacted in a single pass in the process.

Reference may be had to the drawing as illustrative of a process that embodies the invention, and the following description taken in connection with the drawing, is a specific example included merely for illustrative purposes:

A supply of mono-chlorobenzene is fed through the conduit 1 and mixed with any unreacted chlorobenzene which is recovered and returned through the conduit 2. This is charged to the reactor R through the conduit 3. The amount of fresh chlorobenzene fed in the conduit 1 is equivalent to that converted to N-methyl aniline in a single pass in the continuous process.

A fresh supply of methylamine is fed through the conduit 4 and mixed with the return mixture comprising methylamine and copper chloride in solution which is returned through conduit 5. The mixture is discharged through the conduit 6 into the reactor R. The amount of fresh methylamine fed through the conduit 4 is equivalent to that reacted in a single pass in a continuous process.

The reactor R may be constructed so as to operate either continuously or intermittently. Thus it may be a batch reactor or it may be constructed so that the ingredients pass continuously through it at such a rate of flow as to remain in the reactor for a desired length of time. The reactor may comprise a plurality of separate mixers, through which the reaction mixture flows sequentially, and these may be maintained at different pressures or temperatures, if desired.

The conditions in the reactor R are selected to produce an optimum yield per pass. The reactor may be heated by any suitable means.

The temperature selected for the reaction preferably should be such that the reaction proceeds at a rate so that good yields may be obtained in a reasonable time. In general, the temperature should be about 100 to 300° C.; the preferred range being about 150 to 250° C. and within this range a temperature of 210° to 225° C. seems to be optimum when the other variables are optimum. Too high temperatures are to be avoided as they tend to introduce side reactions.

The pressure employed is sufficient to keep the material in the liquid phase at this temperature. Higher pressures may be used but with no material advantage. This suggests the desirability of not employing any higher pressure than is necessary to maintain a liquid phase operation. Pressures within the range of 200 to 1500 pounds per square inch have been observed.

The proportion of the various ingredients for optimum yields may vary considerably. The amount of the catalyst may be expressed conveniently in relation to the methylamine since these are both contained in the same aqueous phase. The ratio of the copper chloride catalyst to the methylamine may be from 0.01 to 1.0, expressed as copper (atomic)/methylamine (mol). With larger amounts of catalyst it is possible to utilize somewhat lower temperatures and shorter reaction times and this suggests the use of a large amount. Generally, a ratio of 0.1 to not over 0.4 is desirable. There is some evidence that the conversion of chlorobenzene per pass falls off somewhat if the amount of the catalyst is too large. The amount to be selected in a commercial embodiment will be within the above ranges and will be related largely to the other variables of the process. In order that the amount of catalyst to be recovered is not unduly great, the amount to be used in a commercial operation will be the minimum that will produce the desired yield under the operating conditions.

The ratio of the methylamine to the chlorobenzene is such as to have a substantial excess of the methylamine, since this removes the hydrochloric acid by-product, the accumulation of which otherwise would slow the reaction. Stoichiometric considerations indicate that at least 2 mols of methylamine should be used for each mol of chlorobenzene. There is probably no upper limit except the objection to recycling the excess. An upper limit of 10 mols is reasonable in a commercial operation. In such a process there is no reason to have an excess larger than necessary for good yields.

The reaction time should be adjusted with reference to the other variables and should be such as to obtain as high a yield as possible. Under the optimum conditions of the other variables good yields can be obtained in a reaction time as small as 10 minutes, but preferably the reaction time is from one-half to one hour. With increased amounts of catalyst, optimum proportions and at the higher temperatures, the reaction time can be made very short.

The concentration of the methylamine in the aqueous phase is more or less critical and has an important effect upon the yield of the N-methyl aniline, especially when the minimum reaction time is used as it would be in a continuous commercial operation. The preferred concentration is 40 to 75% methylamine based on the total aqueous phase. The optimum concentration appears to be about 60%, and the conversion per pass falls off on either side of this figure unless much longer reaction times are used. It is very desirable to obtain optimum conversion per pass in a minimum time as this increases the net amount of the N-methyl aniline that can be made with equipment of a given capacity. This effect of the concentration of methylamine is quite unexpected since the literature states that the concentration of ammonia in the amination of chlorobenzene has no affect on the rate of the reaction when ammonia is employed.

As indicative of the yields that may be obtained in accordance with the invention, 450 parts by weight of a 40% aqueous solution of methylamine containing 92 parts by weight of cuprous chloride was charged into the stirred reactor R. This amounts to 0.16 mol of catalyst (expressed as copper) per mol of methylamine; 130 parts by weight of chlorobenzene was also charged to the reactor R. The molal ratio of methylamine to chlorobenzene is 5:1. These are within the ranges heretofore described.

The reaction mixture was agitated for 30 minutes while the temperature is maintained at 215 to 225° C. The reaction mixture is then discharged through the conduit 7 by means of the reducing valve 8 into a condenser 9 where it may be cooled, for example, to a temperature of 20 to 100° C. at a pressure to maintain the ingredients in the liquid phase.

The cooled mixture is then discharged through the conduit 10 to a settler S. The upper or organic layer is essentially a mixture of N-methyl aniline and any unreacted chlorobenzene. This is fed through the conduit 11 to the fractionating column F. The N-methyl aniline, since it has the higher boiling point, is separated at the bottom of the column and discharged. The unreacted chlorobenzene is sent through the conduit 15, liquefied in a condenser C, from which it may be returned by the pump 17, through the conduit 2, and reused in the next pass of ingredients.

The non-aqueous layer upon analysis was found to contain 7% unreacted chlorobenzene and 93% N-methyl aniline. Although in this example the methylamine concentration was less than the optimum value for economic reasons, nevertheless the yield was exceptionally high.

As illustrative of an additional example in which the methylamine concentration was maintained at the optimum value but the amount of catalyst was exceptionally small in order to minimize the recovery thereof, 5 mols of a 60% aqueous solution of methylamine containing 0.04 mol of $Cu_2Cl_2$ per mol of methylamine was reacted for one-half hour at a temperature of 200 to 230° C. with 1 mol of chlorobenzene. The procedure in general was that described in the previous example and the conversion of chlorobenzene to N-methyl aniline was 75% per pass.

The aqueous layer from the settler S contains the excess of methylamine, the methylamine hydrochloride formed in the reaction and the copper chloride catalyst in solution. The conditions outside the reactor R usually will be at about room temperature, and will generally be under 100° C. in order to avoid the use of pressure equipment.

The aqueous layer is discharged through the conduit 12 to a flow divider 13 which comprises control valves with appropriate meters and controls. One portion of the flow is sent through the conduit 14 to the mixer M to be referred to later. The second portion of the flow is sent through the conduit 15 to the stripping column 16. Caustic soda is introduced into the stripping column by means of the conduit 17 in an amount sufficient to release all of the methylamine from the hydrochloride and to precipitate all of the copper. The stripping column is provided with a heater or coils 18 which vaporizes all of the liberated methylamine which exits from the top of the column through the conduit 19 and is sent through the mixer M.

The copper precipitate in the form of a slurry is withdrawn from the bottom of the stripping column 16 through the conduit 20 and sent to a separator 21 which may be in the form of a continuous pressure filter or a centrifuge. The recovered copper precipitate is withdrawn through the conduit 22 and the salt solution exits through the conduit 23. The copper oxide precipitate is mixed with water introduced through the line 24 and formed into a slurry which flows through the conduit 25 to the mixer M. The amount of water introduced through the line 24 is adjusted so that it will equal the amount of water lost in the filtrate through the conduit 23 less the amount of water in the solution of caustic soda fed through the line 17. In this way the amount of water in the system is kept constant.

In the mixer M the slurry of the copper precipitate reacts, at least in part, with the methylamine hydrochloride introduced through the conduit 14 to form copper chloride and methylamine:

$$2CH_3NH_3Cl + Cu_2O \rightarrow 2CH_3NH_2 + Cu_2Cl_2 + H_2O$$

The relative amounts of the material divided between the conduits 14 and 15 will depend primarily upon the extent of the conversion per pass, and the ratio of the catalyst to the amine in the aqueous phase; it will be regulated so that the chloride ion in the material in the returning conduit 5 will be constant. In practice in a comercial operation, it will be possible to adjust the flow so that the amine hydrochloride and the copper precipitate are in the proportions indicated by the above reaction. The reaction need not be completed in the mixer to obtain the advantages of the invention. The mixture may be heated in the mixer M. If desired, the flow may be divided so that conduit 14 carries a slight excess above the amount stoichiometrically required, since the presence of a slight excess of the amine hydrochloride in the recycled phase will not be harmful. For maximum efficiency, however, it is desirable to recover as much of the amine from the hydrochloride as possible in each pass.

The illustrative embodiment described in connection with the drawing is intended only as a flow sheet and not as a description of the relative size, location and description of the various pieces of apparatus to be used. Those skilled in the art will be able to select the latter in view of the method explained herein.

It will be obvious that many modifications may be made in the process other than the specific flow sheet indicated. It may be desirable, for instance, to introduce the fresh methylamine into the mixer M, rather than through the conduit 4, in order to avoid any possible change in the physical characteristics of the solution which may result from the introduction just prior to the reactor.

The important and fundamental aspect of the invention is that the amount of caustic soda added through the line 17 will be stoichiometrically equivalent to the amount of methylamine consumed in the reaction, so that the process consumes only equivalent quantities of chlorobenzene, methylamine and caustic soda, with the production of N-methyl aniline and waste sodium chloride solution. However, the process reduces the amount of the copper to be filtered as compared with the amount that would be required if all of the aqueous phase were sent to the stripping column 16; in addition, the catalyst is in solution at the time it is introduced into the reactor.

Experiments show that the process of the invention is superior to a process of treating none of the aqueous layer and also superior to a process of treating all of the aqueous layer for catalyst recovery.

If none of the aqueous layer is treated with caustic, the concentration of the methylamine hydrochloride builds up rapidly in a continuous process and the yields of the aryl amine are greatly decreased.

When all of the aqueous phase is treated with caustic and the recovered copper oxide was recycled, greatly decreased yields were obtained as compared with an initial cycle of the catalyst as copper chloride, and as compared with the yields obtained in accordance with the invention.

Extensive study has shown that the treatment of only a portion of the lower layer with caustic in accordance with the invention produces yields which are only very slightly less than that obtained in the initial cycle with a fresh copper chloride catalyst charge. Thus in addition to the high yields, the reduction in the amount of copper oxide to be filtered per pass is reduced. This last item is of a tremendous advantage in view of the fact that the hydrated copper oxide precipitate is very difficult to filter.

The process has been described as applied to the production of N-methyl aniline from chlorobenzene and methylamine. The process can be applied to the production of aniline, toluidines, xylidines, cumidines, etc., by the reaction of the appropriate halogenated aromatic with ammonia, or other N-alkyl anilines, toluidines, xylidines, cumidines, etc., by reaction with other amines, such as ethylamine, di-methylamine, and other lower alkyl amines of different varying degrees of substitution. By lower amines is meant alkyl radicals as 5 carbon atoms or less. The exact conditions to be selected can be determined by those skilled in the art.

The process that has been described is one in which the halogen is chlorine. Since the chlorinated aromatics are cheaper, they would invariably be used on a commercial scale. However, any other aromatic halides could be used similarly. Polyhalogenated aryl compounds may be used to form similar polyamines.

The neutralizing base has been disclosed as caustic soda but it may be any base stronger than ammonia or the amine being used, such as caustic potash or lime. In general bases of alkali and alkaline earth metals are preferred.

In the above description a preference for copper chloride as the catalyst has been indicated. This may be either $Cu_2Cl_2$ or $CuCl_2$ which are about of equal effectiveness as starting materials. The copper chloride may shift from the cuprous to the cupric state and vice versa depending on the conditions of the reaction.

It is obvious that our invention may be practiced by variations in the conditions and other factors indicated heretofore and we intend all of the same to be included within the invention as filed within the scope of the following claims.

We claim:

1. The process of making aryl amines which comprises mixing a non-aqueous phase comprising chlorobenzene with an aqueous phase comprising an ammoniacal compound selected from the group consisting of ammonia and lower alkyl amines and a copper chloride catalyst at a temperature and for a time to obtain the aryl amine corresponding to said ammoniacal compound as the wanted product and the corresponding ammoniacal hydrochloride as a by-product, the relative proportions of said two phases being such as to provide at least 2 mols of ammoniacal compound for each mol of the chlorobenzene, separating the aqueous and non-aqueous phases from the reaction, separating the aryl amine from any unreacted chlorobenzene and recycling the latter with a fresh amount of chlorobenzene equal to that consumed in the reaction, dividing the aqueous phase into two portions, neutralizing the first portion with an amount of a base stronger than the ammoniacal compound to liberate the ammoniacal compound from the ammoniacal compound hydrochloride and precipitate the copper from a solution of the chloride salt formed in the neutralization, separating and recycling the ammoniacal compound, separating the precipitate, recycling the precipitate and the second portion of the aqueous phase, and adding an amount of ammoniacal compound equivalent to that consumed, the relative amounts of said first and second portions being such that ammoniacal compound is recovered from the ammoniacal compound hydrochloride by-product of the chlorobenzene reaction and substantially all of the copper catalyst is dissolved.

2. The process of making aryl amines which comprises mixing a non-aqueous phase comprising chlorobenzene with an aqueous phase comprising an ammoniacal compound selected from the group consisting of ammonia and lower alkyl amines and a copper chloride catalyst at a temperature and for a time to obtain the aryl amine corresponding to said ammoniacal compound as the wanted product and the corresponding ammoniacal hydrochloride as a by-product, the relative proportions of said two phases being such as to provide at least 2 mols of ammoniacal compound for each mol of the chlorobenzene, separating the aqueous and non-aqueous phases from the reaction, separating the aryl amine from any unreacted chlorobenzene and recycling the latter with a fresh amount of chlorobenzene equal to that consumed in the reaction, dividing the aqueous phase into two portions, neutralizing the first portion with an amount of alkali metal caustic to liberate the ammoniacal compound from the ammoniacal compound hydrochloride and precipitate the copper from a solution of the alkali metal chloride formed in the neutralization, separating the ammoniacal compound and adding it to a recycle solution, separating the precipitate and placing it in a slurry with an amount of water equivalent to that withdrawn in the salt solution less any added with the caustic, adding said slurry to the recycle solution, adding the second portion of the aqueous phase to the recycle solution, adding to the recycle solution an amount of ammoniacal compound equivalent to that consumed and introducing this mixture into the reaction zone, the relative amounts of said first and second portions being such that substantially all of the ammoniacal compound is recovered from the ammoniacal compound hydrochloride by-product of the chlorobenzene reaction and substantially all of the copper catalyst is dissolved.

3. A continuous process of making aniline, which comprises mixing a non-aqueous phase comprising chlorobenzene with an aqueous phase comprising ammonia and a copper chloride catalyst at a temperature and for a time to obtain aniline as the wanted product and ammonia hydrochloride as a by-product, the relative proportions of said two phases being such as to provide at least 2 mols of ammonia for each mol of the chlorobenzene; separating the aqueous and non-aqueous phases from the reaction, separating the aniline produced from any unreacted chlorobenzene and recycling the latter with a fresh amount of chlorobenzene equal to that consumed in the reaction, dividing the aqueous phase into two portions, neutralizing the first portion with an amount of caustic soda to liberate ammonia from the ammonia hydrochloride and to precipitate the copper from a solution of the sodium chloride formed in the neutralization, separating the ammonia and adding it to a recycle solution, separating the precipitate and placing it in a slurry with an amount of water equivalent to that withdrawn in the salt solution less any added with the caustic, adding said slurry to the recycle solution, adding the second portion of the aqueous phase to the recycling solution, adding to the recycle solution an amount of ammonia equivalent to that consumed, and introducing this mixture into the reaction zone, the relative amounts of said first and second portions being such that substantially all of the ammonia is recovered from the ammonia hydrochloride by-product of the chlorobenzene reaction and substantially all of the copper catalyst is dissolved.

4. A continuous process of making N-methyl aniline, which comprises mixing a non-aqueous phase comprising chlorobenzene with an aqueous phase comprising 40 to 75% methylamine and copper chloride catalyst at a temperature in the range of 150 to 250° C. and for a time in the range of one-half to one hour, the relative proportions of said two phases being such as to provide at least 2 mols of the methylamine for each mol of the chlorobenzene; separating the aqueous and non-aqueous phases after the reaction has proceeded to form N-methyl aniline as the wanted product and methylamine hydrochloride as a by-product, separating the N-methyl aniline from any unreacted chlorobenzene and recycling the latter with a fresh amount of chlorobenzene equal to that consumed in the reaction zone, dividing the aqueous phase into two portions, neutralizing the first portion with an amount of caustic soda to liberate methylamine from the methylamine hydrochloride and to precipitate the copper from the solution of the sodium chloride formed in the neutralization, separating the methylamine and adding it to a recycle solution, separating the precipitate and placing it in a slurry with an amount of water equivalent to that withdrawn in the salt solution less any added with the caustic, adding said slurry to the recycle solution, adding the second portion of the aqueous phase to the recycle solution, adding to the recycle solution an amount of methylamine equivalent to that consumed, and introducing this mixture into the reaction zone, the relative amounts of said first and second portions being such that substantially all of the methylamine is recovered from the methylamine hydrochloride by-product of the chlorobenzene reaction and substantially all of the copper catalyst is dissolved.

EVERETT C. HUGHES.
FRANKLIN VEATCH.

REFERENCES CITED

The following references are of record in the file of this patent:

UNITED STATES PATENTS

| Number | Name | Date |
|---|---|---|
| 1,935,515 | Mills | Nov. 14, 1933 |
| 2,028,065 | Hale | Jan. 14, 1936 |
| 1,726,170 | Britton | Aug. 27, 1929 |
| 1,726,171 | Williams | Aug. 27, 1929 |
| 1,726,172 | Williams | Aug. 27, 1929 |

OTHER REFERENCES

Chem. Abstracts, vol. 31 (1937), p. 1776.